United States Patent
Xia

(10) Patent No.: US 9,680,190 B1
(45) Date of Patent: Jun. 13, 2017

(54) INTELLIGENT MULTIPLE-LOOP ELECTRIC VEHICLE COOLING SYSTEM

(71) Applicant: Bordrin Motor Corporation, Southfield, MI (US)

(72) Inventor: Yingbo Xia, Shanghai (CN)

(73) Assignee: BORDRIN MOTOR CORPORATION, INC., Southfield, MI (US)

( * ) Notice: Subject to any disclaimer, the term of this patent is extended or adjusted under 35 U.S.C. 154(b) by 0 days.

(21) Appl. No.: 15/442,956

(22) Filed: Feb. 27, 2017

(51) Int. Cl.
| | |
|---|---|
| H01M 10/63 | (2014.01) |
| H01M 10/65 | (2014.01) |
| H01M 10/60 | (2014.01) |
| B60L 11/18 | (2006.01) |
| H01M 10/637 | (2014.01) |
| H01M 2/10 | (2006.01) |
| H01M 10/613 | (2014.01) |
| H01M 10/625 | (2014.01) |
| H01M 10/6552 | (2014.01) |
| H01M 10/6568 | (2014.01) |
| H01M 10/6557 | (2014.01) |
| H01M 10/48 | (2006.01) |
| H01M 10/42 | (2006.01) |

(52) U.S. Cl.
CPC ....... H01M 10/637 (2015.04); B60L 11/1874 (2013.01); H01M 2/1077 (2013.01); H01M 10/425 (2013.01); H01M 10/486 (2013.01); H01M 10/613 (2015.04); H01M 10/625 (2015.04); H01M 10/6552 (2015.04); H01M 10/6557 (2015.04); H01M 10/6568 (2015.04); *H01M 2200/106* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 6,481,230 B2 | 11/2002 | Kimishima et al. | |
| 2011/0296855 A1* | 12/2011 | Johnston | B60L 3/0046 62/79 |
| 2016/0107508 A1* | 4/2016 | Johnston | B60H 1/00278 165/202 |

FOREIGN PATENT DOCUMENTS

| | | |
|---|---|---|
| CN | 101000972 A | 7/2007 |
| CN | 102013533 A | 4/2011 |
| CN | 102255117 A | 11/2011 |

* cited by examiner

*Primary Examiner* — Patrick Ryan
*Assistant Examiner* — Christopher Domone
(74) *Attorney, Agent, or Firm* — Brinks Gilson & Lione

(57) ABSTRACT

An intelligent multiple-loop electric vehicle cooling system includes a battery pack, an electric drive module, a battery radiator, an electric drive module radiator, electric pumps, pass-through valves, three-way valves, a PTC heater, a heat exchanger. The cooling system is provided with two electric pumps, two pass-through valves, and three three-way valves that are connected through pipelines to form multiple loops. Compared with the prior art, by means of the present invention, multiple three-way valves and pass-through valves are disposed, to connect pipelines to form loops meeting different cooling or heating requirements. These loops are selectively opened or closed according to features and working states of a battery pack and an electric drive module of an electric vehicle, to ensure temperature balance of the electric vehicle and efficient operation of the electric vehicle.

10 Claims, 6 Drawing Sheets

INTELLIGENT MULTIPLE-LOOP ELECTRIC VEHICLE COOLING SYSTEM

BACKGROUND

1. Field of the Invention

The present invention relates to the field of electric vehicle technologies, and in particular, to an intelligent multiple-loop electric vehicle cooling system.

2. Description of Related Art

More attention is being paid to environment issues due to energy consumption, such as pollution resulting from the use of petroleum. Electric vehicles, which do not use petroleum, are becoming increasingly popular because of this concern regarding environmental pollution and energy conservation. As such, electric vehicles have currently experienced and are expected to experience increasing production and sales volumes year over year.

Compared with the conventional vehicles, electric vehicles do not output greenhouse gasses and are therefore very friendly to environment. However, electric vehicles have some development bottlenecks, a relative long charging time, and a mileage range generally being not better than that of conventional vehicles. To reduce a gap with the conventional vehicles with regards to range, electric vehicles are required to be as energy efficient as possible. For current electric vehicles, energy-savings due to the efficient cooling systems of the electric vehicles are generally not significant. Further, a battery pack cooling system may not be shared with an electric drive module cooling system.

Generally, cooling of a battery pack either excessively relies on air conditioning cooling, causing the mileage range to be shorter, or relies on a battery radiator disposed in front of a condenser to perform cooling, resulting in reduced efficiency of the front-end module. In addition, this set up also adds wind resistance of to the vehicle, resulting in a less fuel efficient vehicle.

The Chinese Patent No. CN205768485U discloses an electric vehicle with an integrated thermal management system including a main heat exchanger, a passenger-compartment heat exchanger, an electric control system, a motor pump, a four-way reversing valve, a condenser, a solenoid valve, two three-way ball valves, an evaporator, a water pump, a battery grip, a heat pipe, and a battery heat exchanger. In this arrangement, the heat flow of three thermal management systems (an air conditioning system, a motor electric control system, and a battery pack thermal management system) of an entire vehicle can be fully utilized for improving cooling efficiency of the entire-vehicle. By so doing, battery power requirement for heat dissipation and heating are reduced, temperature balance between battery cells is ensured, and mileage range of the vehicle and service life of a battery system are prolonged. However, this arrangement has the drawback that control loops formed in the system are relatively few and functions of components inside the system cannot be effectively controlled.

SUMMARY

An objective of the present invention is to provide an intelligent multiple-loop electric vehicle cooling system to resolve the foregoing problems. The objective of the present invention is achieved by using the following technical solutions.

An intelligent multiple-loop electric vehicle cooling system includes a battery pack, an electric drive module, a battery radiator, an electric drive module radiator, electric pumps, pass-through valves, three-way valves, a positive temperature coefficient (PTC) heater, and a heat exchanger. The battery pack and the electric drive module are provided with internal cooling pipelines. The internal cooling pipelines are connected to pipelines in the system and the heat exchanger is connected to an external air conditioning cooling component. The cooling system is provided with two electric pumps, two pass-through valves, and three three-way valves. These components are connected in the pipelines. The pipelines are filled with coolant. The battery pack, the electric drive module, the battery radiator, the electric drive module radiator, the electric pumps, the PTC heater, and the heat exchanger form multiple loops.

The battery pack is serially connected to a first three-way valve, a second three-way valve, a second pass-through valve, and a first electric pump, to form a battery pack temperature balancing loop. When a temperature of the battery pack falls within a proper range (which is neither excessively hot nor excessively cold), but a temperature difference between battery cells is large and exceeds a proper range (it is generally considered that the temperature difference between battery cells being less than 5° C. is the proper range), temperature balancing needs to be performed on the battery pack. The temperature balancing loop may effectively reduce the temperature difference between the battery cells of the battery pack.

The battery pack is serially connected to the first three-way valve, the second three-way valve, the battery radiator, and the first electric pump to form a battery pack medium-high temperature cooling loop. When the temperature of the battery pack exceeds the proper range (for a lithium-ion battery, it is generally considered that the lithium-ion battery has a relatively high temperature when the temperature exceeds 40° C.), the battery pack needs to be cooled. When a temperature of external air is excessively high or an internal heating power of the battery pack is excessively large, the medium-high temperature cooling loop cannot meet a heat dissipation requirement of the battery pack and needs to perform cooling on the battery pack by relying on air conditioning cooling in this case.

The battery pack is serially connected to the first three-way valve, the heat exchanger, and the first electric pump, to form a battery pack air conditioning cooling loop. Heat exchange is performed by using an air conditioning refrigerant, so that the coolant temperature is quickly lowered, and the internal temperature of the battery pack can be quickly lowered.

The battery pack is serially connected to the first three-way valve, the first pass-through valve, the PTC heater, and the first electric pump, to form a battery pack low-temperature heating loop. When the temperature of the battery pack is relatively low (for a lithium-ion battery, it is generally considered that the lithium-ion battery has a relatively low temperature when the temperature is lower than 0° C.), it is necessary to heat the battery pack, and the battery pack low-temperature heating loop may meet a heating requirement of the battery pack in a low-temperature state.

The electric drive module is serially connected to the electric drive module radiator, a second electric pump, and a third three-way valve, to form an electric drive module cooling loop for cooling an electric drive module component, particularly high power component such as a driving motor or a motor controller. Cooling of the electric drive module may be independent of that of the battery pack, and there is no heat transmission between the two.

The electric drive module is connected to the battery pack in parallel, to form a parallel loop between the battery pack and the electric drive module. When a heat dissipation requirement of the electric drive module is not large, the temperature of the coolant inside an electric drive module cooling system is not high, and the electric drive module is connected to the battery pack in parallel, to implement shunting of the coolant, and facilitate energy saving.

The electric drive module radiator is serially connected to the battery pack, to form a series loop. When the electric drive module has little heat dissipation and does not need to be cooled, the coolant does not flow through the internal cooling pipeline of the electric drive module any more. The electric drive module radiator is serially connected to the battery pack, and is used for cooling the battery pack. Therefore, the internal temperature of the battery pack can be quickly lowered.

The cooling system is provided with an auxiliary radiating electric fan next to the electric drive module radiator and the battery radiator. The electric fan may fasten a heat dissipation process, and operation of the electric fan may enable heat of the coolant to be transmitted to external air more, so that the coolant temperature is lowered.

Installation locations of the radiators and the electric fan are relatively flexible, may be arranged according to vehicle structure features of an electric vehicle, and may be close to the front of the vehicle, or may be disposed at the tail of the vehicle, or may be at another place of the vehicle body. One or more electric fans may be disposed according to a requirement.

The electric pumps, the electric fan, the pass-through valves, and the three-way valves are connected to a vehicle controller. The cooling system is provided with temperature sensors inside the battery pack and the electric drive module, as well as at inlet ends of the pass-through valves and the three-way valves. The temperature sensors are connected to the vehicle controller and output a collected temperature to the vehicle controller. The vehicle controller performs a decision according to a temperature signal, controls on and off of the electric pumps, or continuously controlling the speed of the electric pumps, based on pump types, the electric fan, the pass-through valves, and the three-way valves, and effectively adjusts heat exchange of the system in time.

A throttle is disposed on a connecting pipeline between the heat exchanger and the external air conditioning cooling component, and the throttle on a branch of an air conditioning system is adjusted to implement air conditioning cooling on the battery pack. When the air conditioning cooling does not need to be performed on the battery pack, working states of the three-way valves and the throttle may be adjusted, and a branch at which the heat exchanger is located is closed.

The air conditioning cooling component includes a condenser, an electric compressor, an evaporator, an electronic expansion valve, and a liquid-storage drying pot that are serially connected in sequence.

The battery radiator is connected to the second pass-through valve in parallel. When there is no need to use the battery radiator, only the second pass-through valve needs to be opened, so that energy of the system can be optimally used.

The electric drive module includes a motor, a motor controller, a DC-DC converter, and other power electronic components.

The battery pack is formed by multiple battery cells that are connected serially or in parallel.

Beneficial effects of the present invention are several. For example, multiple three-way valves and pass-through valves are disposed, so that pipelines are connected into multiple loops that can be automatically adjusted. Open degrees of the three-way valves and the pass-through valves may form loops meeting different cooling or heating requirements. These loops are selectively opened or closed according to features and working states of a battery pack and an electric drive module of an electric vehicle, to ensure temperature balance of the electric vehicle and efficient operation of the electric vehicle. The system is significant in energy saving, cooling of the battery pack is associated with that of the electric drive module.

When performing cooling, the battery pack does not merely rely on air conditioning cooling, but may perform auxiliary heat dissipation by using the electric drive module radiator in addition to the battery radiator without causing negative effects on an air conditioner and heat dissipation effects of an electric drive system, so that the mileage range of the electric vehicle becomes longer, and the overall efficiency of the vehicle improves.

Further objects, features and advantages of this invention will become readily apparent to persons skilled in the art after a review of the following description, with reference to the drawings and claims that are appended to and form a part of this specification.

DETAILED DESCRIPTION

The following describes the present invention in detail with reference to the accompanying drawings and specific embodiments.

Figure 1:
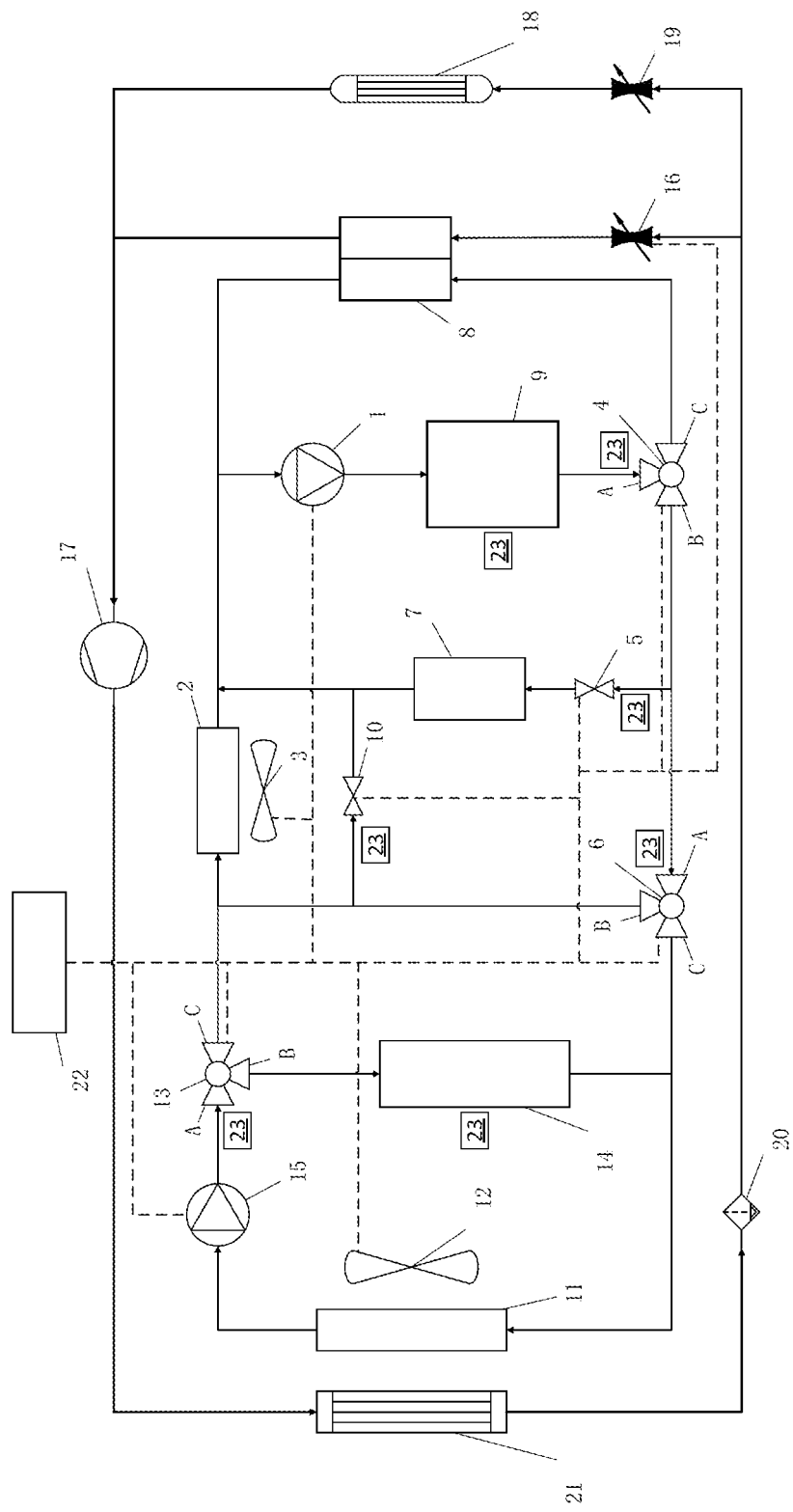
FIG. 1 is a schematic structural diagram of a cooling system according to the present invention.

As shown in FIG. 1, the present invention provides an intelligent multiple-loop electric vehicle cooling system including a battery pack 9, an electric drive module 14, a battery radiator 2, an electric drive module radiator 11, electric pumps 1 and 15, pass-through valves 5 and 10, three-way valves 4, 6, and 13, a PTC heater 7, and a heat exchanger 8, where the battery pack 9 and the electric drive module 14 are provided with internal cooling pipelines \, the internal cooling pipelines are connected to pipelines in the system, and the heat exchanger 8 is connected to an external air conditioning cooling component. The cooling system is provided with two electric pumps 1 and 15, two pass-through valves 5 and 10, and three three-way valves 4, 6, and 13. The three-way valves 4, 6, and 13 are connected to the pass-through valves 5 and 10 in the pipelines. The three-way and pass-through valves are reconfigurable. They connect and configure the battery pack, the electric drive module, the battery radiator 2, the electric drive module radiator 11, the electric pumps 1 and 15, the PTC heater 7, and the heat exchanger 8, to form multiple loops.

The electric pumps 1 and 15, electric fans 3 and 12, the pass-through valves 5 and 10, the throttle 16, and the three-way valves 4, 6, and 13 of the present invention may all or partially be connected and/or controlled by a vehicle controller 22, which may comprise one or more microcontrollers. The cooling system is provided with temperature sensors 23 inside the battery pack and the electric drive module, as well as at inlet ends of the pass-through valves 5 and 10 and the three-way valves 4, 6, and 13. The temperature sensors are connected to the vehicle controller 22 and output a collected temperature to the vehicle controller 22. The vehicle controller 22 performs a decision according to a temperature signal, controls on and off of the electric pumps 1 and 15, electric fans 3 and 12, the pass-through valves 5 and 10, and the three-way valves 4, 6, and 13, and effectively adjusts heat exchange of the system in time.

Figure 2:
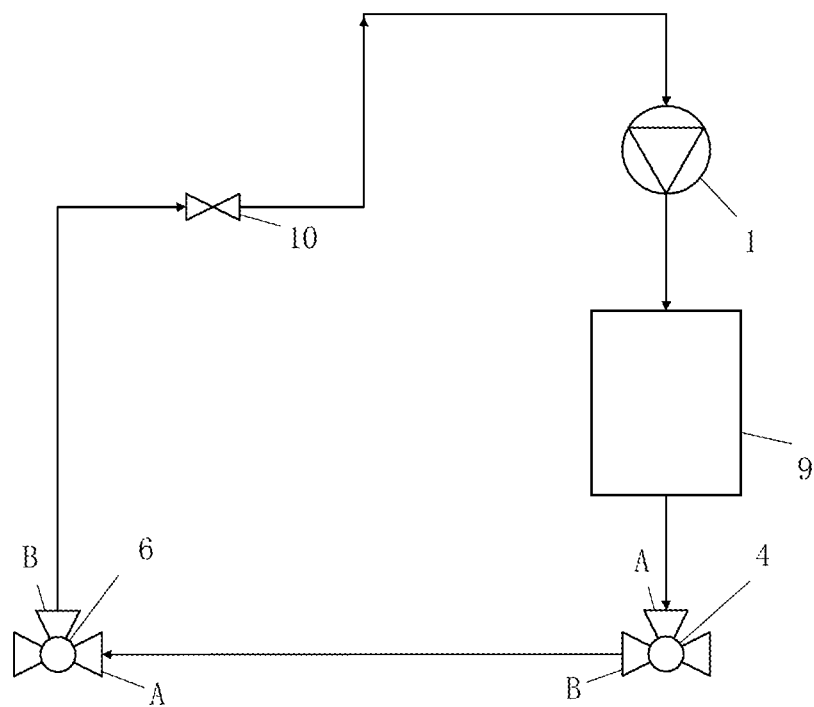
FIG. 2 is a schematic structural diagram of a battery pack temperature balancing loop.

Referring to FIG. 2, when a temperature of the battery pack falls within a proper range (which is neither excessively hot nor excessively cold), but a temperature difference between battery cells is large and exceeds a proper range (for example, the temperature difference between the battery cells being less than 5° C. is the proper range), temperature balancing needs to be performed on the battery pack.

Coolant is driven by a first electric pump 1 and flows through an internal cooling pipeline of the battery pack 9. Next, the coolant flows into an inlet A of a first three-way valve 4, then flows out from an outlet B, and next flows into an inlet A of a second three-way valve 6. Thereafter, the coolant flows out from an outlet B of the second three-way valve 6, and then flows through a pass-through valve 10. Finally, the coolant flows back to the first electric pump 1 to form a battery pack temperature balancing loop. The temperature balancing loop may effectively reduce the temperature difference between the battery cells of the battery pack.

Figure 3:
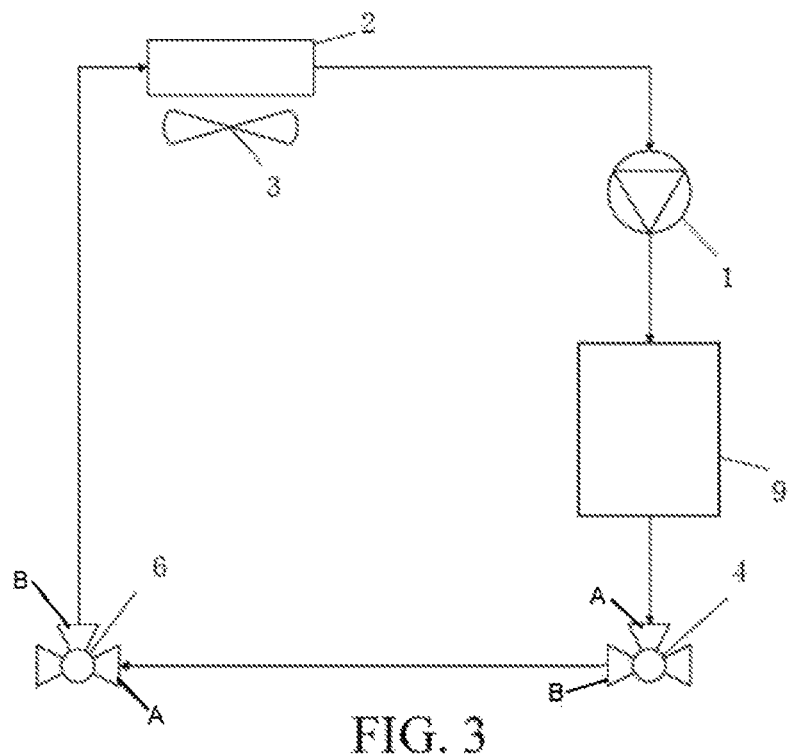
FIG. 3 is a schematic structural diagram of a battery pack medium-high temperature cooling loop.

Referring to FIG. 3, when the internal temperature of the battery pack exceeds the proper range (for a lithium-ion battery, it is generally considered that the lithium-ion battery has a relatively high temperature when the temperature exceeds 40° C.), the battery pack needs to be cooled. The coolant first flows to the first electric pump 1 and flows through the internal cooling pipeline of the battery pack 9. Next, the coolant flows into the inlet A of the first three-way valve 4 and flows out from the outlet B, and then flows into the inlet A of the second three-way valve 6 and flows out from the outlet B.

In this case, the pass-through valve 10 is in a closed state, the coolant flows to the battery radiator 2, heat in the coolant is dissipated to external air through operation of a first electric fan 3, and the coolant flows back to the first electric pump 1 after a temperature of the coolant is lowered, so that a battery pack medium-high temperature cooling loop is formed.

Figure 4:
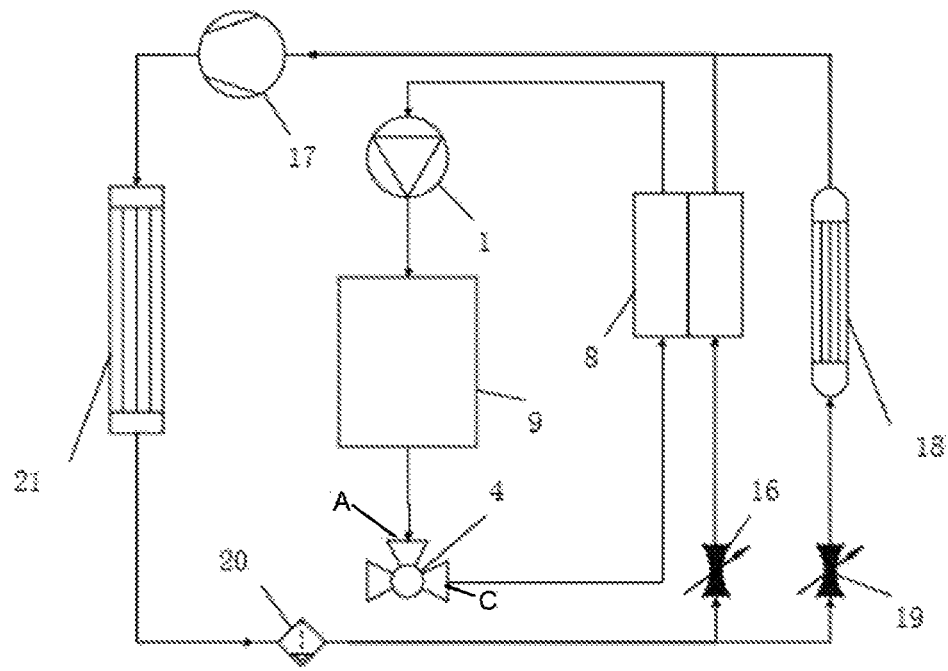
FIG. 4 is a schematic structural diagram of a battery pack air conditioning cooling loop.

When a temperature of the external air is excessively high or an internal heating power of the battery pack is excessively large, the medium-high temperature cooling loop may not meet a heat dissipation requirement of the battery pack, and needs to perform cooling on the battery pack by relying on air conditioning cooling in this case. Referring to FIG. 4, the air conditioning cooling component includes a condenser 21, an electric compressor 17, an evaporator 18, an electronic expansion valve 19, and a liquid-storage drying pot 20 that are serially connected in sequence. An open degree of a throttle 16 of a by-pass cooling branch of an air conditioning system for cooling the battery back may be controlled to adjust the cooling power of the by-pass cooling branch.

An air conditioning refrigerant is driven by the electric compressor 17, flows though the heat exchanger 8. The first three-way valve 4 of a battery pack cooling system may be controlled to close the outlet B of the first three-way valve 4, and to open outlets A and C. In this case, the coolant is driven by the first electric pump 1, flows through the internal cooling pipeline of the battery pack 9, next flows into the inlet A of the first three-way valve 4 and flows out from the outlet C, then enters the heat exchanger 8, performs heat exchange with the air conditioning refrigerant, so that the temperature of the coolant is quickly lowered, and then flows back to the first electric pump 1. As such, a battery pack air conditioning high-temperature cooling loop is formed, to enable the temperature of the battery pack to be quickly lowered.

Figure 5:
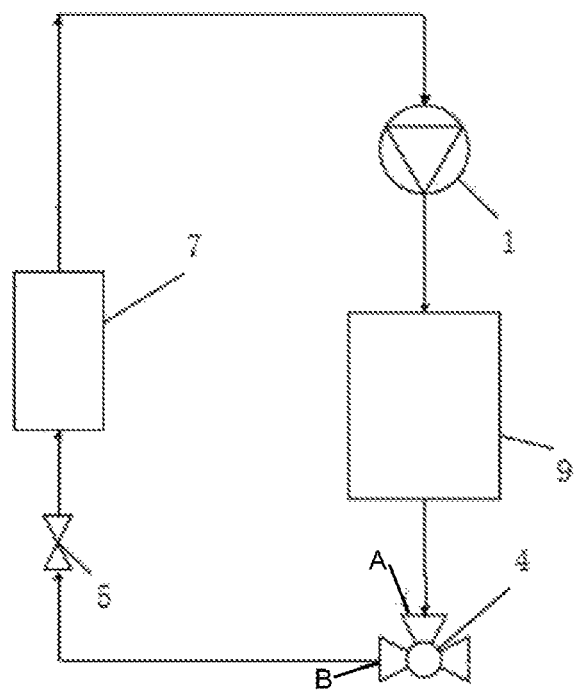
FIG. 5 is a schematic structural diagram of a battery pack low-temperature heating loop.

When the temperature of the battery pack is relatively low (for a lithium-ion battery, it is generally considered that the lithium-ion battery has a relatively low temperature when the temperature is lower than 0° C.), it is necessary to heat the battery pack. As shown in FIG. 5, a first pass-through valve 5 is opened, and the coolant flows into the PTC heater 7 for heating, so that the temperature may reach above 40° C. (for battery safety, it is generally considered that the temperature of the coolant in the PTC heater 7 cannot be higher than 50° C.). The heated coolant then flows to the first electric pump 1 from the PTC heater 7, and next flows into the internal cooling pipeline \ of the battery pack 9 to transfer the heat in the coolant to the battery pack for heating the battery pack. The coolant then flows into the inlet A of the first three-way valve 4 and flows out from the outlet B, and then flows back to the PTC heater 7 through the first pass-through valve 5. As such, a battery pack low-temperature heating loop is formed, for meeting a heating requirement of the battery pack in a low temperature state.

Figure 6:
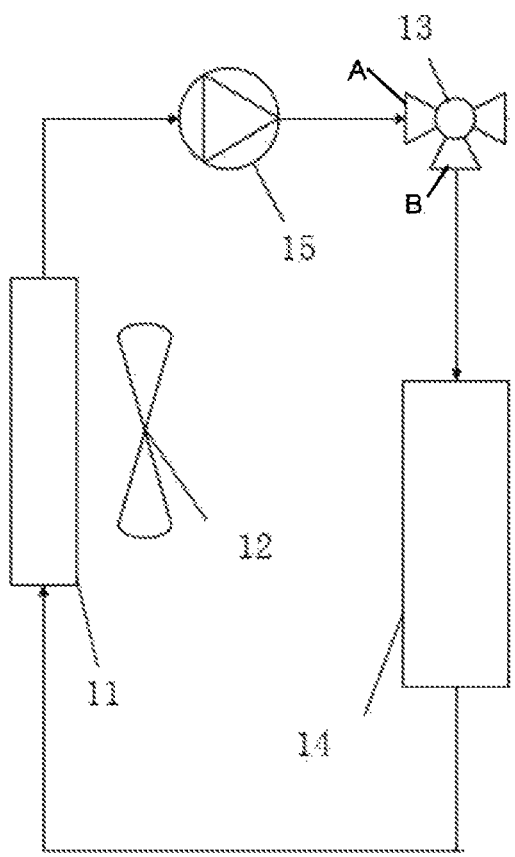
FIG. 6 is a schematic structural diagram of an electric drive module cooling loop.

Referring to FIG. 6, a second electric pump 15, a third three-way valve 13, the electric drive module radiator 11, a second electric fan 12, and an internal cooling pipeline of the electric drive module 14 form an electric drive module cooling system loop. When an electric drive module component (particularly high power component such as a drive motor or a motor controller) needs to be cooled, the coolant is driven by the second electric pump 15, and flows to the internal cooling pipeline of the electric drive module 14. In this case, heat is transferred from the internal component of the electric drive module to the coolant. Then the coolant flows into the electric drive module radiator 11. Operation of the second electric fan 12 may enable the heat of the coolant to be dissipated to the external air more efficiently, so that the temperature of the coolant is lowered quickly. The coolant then flows back to the second electric pump 15.

In the foregoing loops, an electric drive module cooling system and the battery pack cooling system are independent of each other, and there is no heat transfer between the two. In some cases, for example, when a heat dissipation requirement of the electric drive module is not high, the temperature of the coolant inside the electric drive module cooling system is not high. In this case, open degrees of an outlet B and an outlet C of the third three-way valve 13 may be adjusted. For example, the outlet B of the second three-way valve 6 may be closed, and the outlet C of the second three-way valve 6 may be opened at the same time, so as to implement shunting of the coolant, and form a parallel loop between the battery pack cooling system and the electric drive module cooling system.

Figure 7:
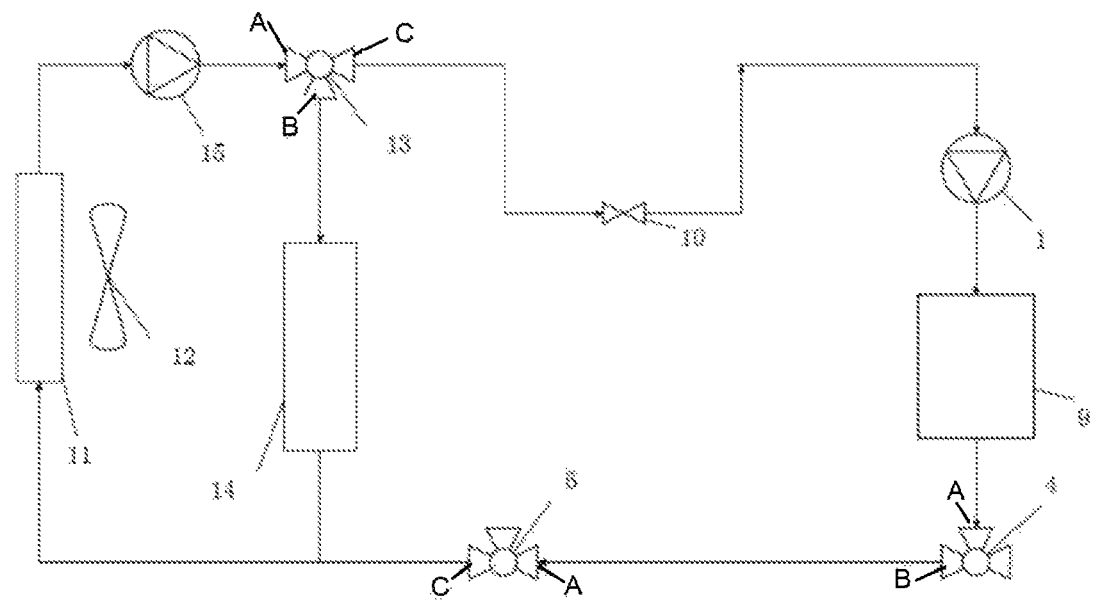
FIG. 7 is a schematic structural diagram of a parallel loop I between a battery pack and an electric drive module.
Figure 8:
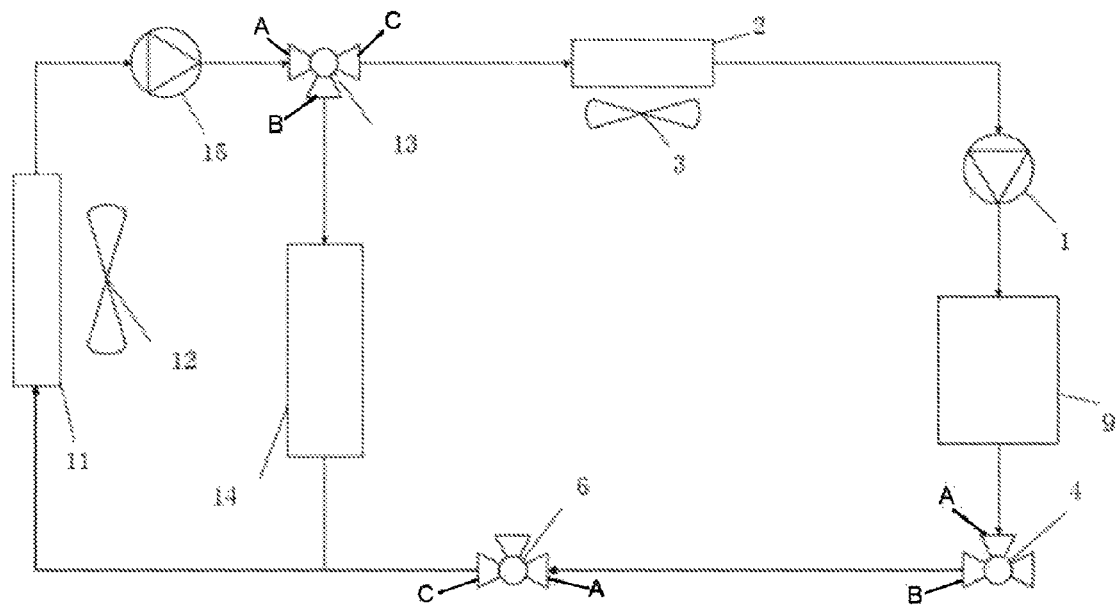
FIG. 8 is a schematic structural diagram of a parallel loop II between the battery pack and the electric drive module.

The parallel loop has two different modes: a parallel loop I (referring to FIG. 7, a second pass-through valve 10 is opened, the coolant does not flow through the battery radiator 2, and the first electric fan 3 is idle) and a parallel loop II (referring to FIG. 8, the second pass-through valve 10 is closed, the coolant flows through the battery radiator 2, and the first electric fan 3 is in operation). The parallel loop I is a preferred configuration. When the parallel loop I cannot meet a cooling requirement of the battery pack, the parallel loop II may be used. In this case, the coolant flowing out from the outlet C of the third three-way valve 13 directly enters the battery radiator 2, so that the temperature is further lowered. The coolant then flows through the first electric pump 1, the internal cooling pipeline of the battery pack 9, the first three-way valve 4 in sequence, into the inlet A of the second three-way valve 6, out from the outlet C, into the electric drive module radiator 11 for cooling, back to the second electric pump 15, and through the third three-way valve 13 for shunting, to form the parallel loop II.

Figure 9:
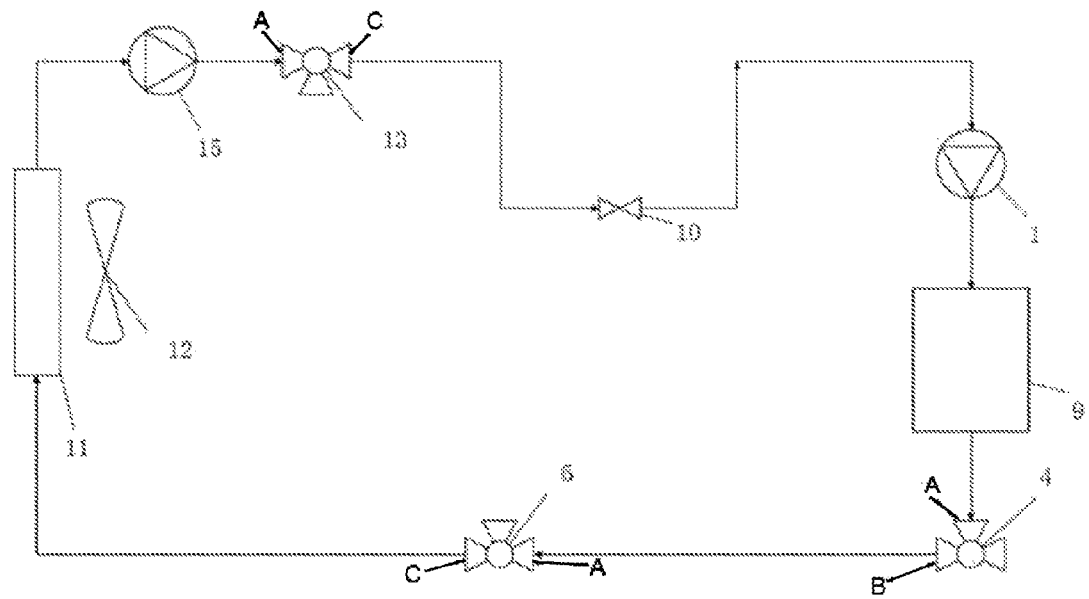
FIG. 9 is a schematic structural diagram of a series loop I between the battery pack and the electric drive module.
Figure 10:
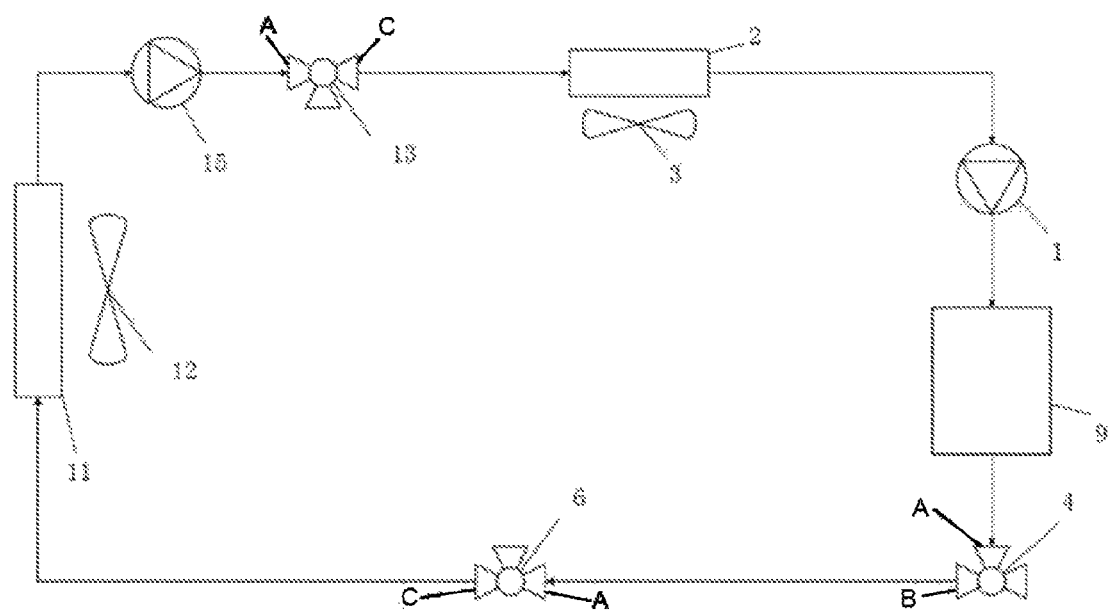
FIG. 10 is a schematic structural diagram of a series loop II between the battery pack and the electric drive module.

When the electric drive module has very little heat emission and does not need liquid cooling, the outlet B of the third three-way valve 13 may be closed and the outlet C of the third three-way valve 13 may be opened, and the outlet B of the second three-way valve 6 is closed and the outlet C of the second three-way valve 6 is opened at the same time. In this case, the coolant inside the electric drive module cooling system does not flow through the internal cooling pipeline of the electric drive module 14 anymore, but flows into the battery pack cooling system, so that a series loop between the battery pack cooling system and electric drive module cooling system is formed. Similarly, the series loop has two modes: a series loop I (referring to FIG. 9, the second pass-through valve 10 is opened, the coolant does not flow through the battery radiator 2, and the first electric fan 3 is idle) and a series loop II (referring to FIG. 10, the second pass-through valve 10 is closed, the coolant flows through the battery radiator 2, and the first electric fan 3 is in operation). The series loop I is preferred When the series loop I cannot meet the cooling requirement of the battery pack, the series loop II may be used, as shown in FIG. 10.

Based on the foregoing, the electric vehicle cooling system provided in the present invention may form loops meeting different cooling or heating requirements by controlling various three-way valves and pass-through valves, and applications of these loops may be selected according to characteristics and working states of battery pack and electric drive module of an electric vehicle.

What is described above is merely exemplary embodiments of the present invention, and is not intended to limit the present invention. Any modifications, equivalent variations, and improvements made in accordance with the spirits and principles of the present invention shall fall within the protective scope of the present invention.

As a person skilled in the art will readily appreciate, the above description is meant as an illustration of implementation of the principles of this invention. This description is not intended to limit the scope or application of this invention in that the invention is susceptible to modification, variation, and change, without departing from the spirit of this invention, as defined in the following claims.

The invention claimed is:

1. An intelligent multiple-loop electric vehicle cooling system comprising:
    a battery pack, an electric drive module, a battery radiator, an electric drive module radiator, a first and second electric pumps, a first and second reconfigurable pass-through valves, a first, second, and third reconfigurable three-way valves, a PTC (Positive Temperature Coefficient) heater, and a heat exchanger,
    wherein the battery pack and the electric drive module are provided with internal cooling pipelines for flow of coolant, the internal cooling pipelines are connected to pipelines in the system, and the heat exchanger is connected to an external air conditioning cooling component;
    wherein the reconfigurable three-way valves and the reconfigurable pass-through valves are disposed in the pipelines for connecting and configuring the battery pack, the electric drive module, the battery radiator, the electric drive module radiator, the electric pumps, the PTC heater, and the heat exchanger in the pipelines into multiple loops;
    wherein the battery pack is serially connected to the first reconfigurable three-way valve, the second reconfigurable three-way valve, the second reconfigurable pass-through valve, and the first electric pump, to form a battery pack temperature balancing loop;
    wherein the battery pack is serially connected to the first reconfigurable three-way valve, the second reconfigurable three-way valve, the battery radiator, and the first electric pump, to form a battery pack medium-high temperature cooling loop;
    wherein the battery pack is serially connected to the first reconfigurable three-way valve, the heat exchanger, and the first electric pump, to form a battery pack air conditioning cooling loop;
    wherein the battery pack is serially connected to the first reconfigurable three-way valve, the first reconfigurable pass-through valve, the PTC heater, and the first electric pump, to form a battery pack low-temperature heating loop;
    wherein the electric drive module is serially connected to the electric drive module radiator, the second electric pump, and the third reconfigurable three-way valve, to form an electric drive module cooling loop;
    wherein the electric drive module is connected to the battery pack in parallel, to form a parallel loop between the battery pack and the electric drive module; and
    wherein the electric drive module radiator is serially connected to the battery pack, to form a series loop.

2. The intelligent multiple-loop electric vehicle cooling system according to claim 1, wherein the cooling system is provided with an auxiliary electric fan next to the electric drive module radiator and the battery radiator.

3. The intelligent multiple-loop electric vehicle cooling system according to claim 2, wherein the electric pumps, the electric fan, the reconfigurable pass-through valves, and the reconfigurable three-way valves are controlled by a vehicle controller.

4. The intelligent multiple-loop electric vehicle cooling system according to claim 3, further comprising temperature sensors inside the battery pack and the electric drive module, as well as at inlet ends of the reconfigurable pass-through valves and the reconfigurable three-way valves, and wherein the temperature sensors are connected to the vehicle controller.

5. The intelligent multiple-loop electric vehicle cooling system according to claim 1, wherein a throttle is disposed on a connecting pipeline between the heat exchanger and the external air conditioning cooling component.

6. The intelligent multiple-loop electric vehicle cooling system according to claim 1, wherein the air conditioning cooling component comprises a condenser, an electric compressor, an evaporator, an electronic expansion valve, and a liquid-storage drying pot that are serially connected in sequence.

7. The intelligent multiple-loop electric vehicle cooling system according to claim 1, wherein the pipelines of the cooling system loops are filled with coolant.

8. The intelligent multiple-loop electric vehicle cooling system according to claim 1, wherein the battery radiator is connected to the second reconfigurable pass-through valve in parallel.

9. The intelligent multiple-loop electric vehicle cooling system according to claim 1, wherein the electric drive module comprises a motor, a motor controller, and a DC-DC converter.

10. The intelligent multiple-loop electric vehicle cooling system according to claim 1, wherein the battery pack is formed by multiple battery cells that are connected serially or in parallel.

* * * * *